United States Patent [19]

Kawamoto

[11] 4,320,670

[45] Mar. 23, 1982

[54] SHIFT INTERLOCK MECHANISM OF A VEHICLE POWER TRANSMISSION

[75] Inventor: Tamio Kawamoto, Sagamihara, Japan

[73] Assignee: Nissan Motor Co., Ltd., Yokohama, Japan

[21] Appl. No.: 115,282

[22] Filed: Jan. 25, 1980

[30] Foreign Application Priority Data

Jan. 30, 1979 [JP] Japan .................................. 54/9865

[51] Int. Cl.³ ............................................. G05G 5/10
[52] U.S. Cl. ..................................................... 74/477
[58] Field of Search ........................................ 74/477

[56] References Cited

U.S. PATENT DOCUMENTS

| | | | |
|---|---|---|---|
| 3,929,029 | 12/1975 | Kelbel | 74/477 X |
| 3,962,930 | 6/1976 | Frazee | 74/477 X |
| 4,193,316 | 3/1980 | Kelbel | 74/477 |

FOREIGN PATENT DOCUMENTS

| | | |
|---|---|---|
| 606454 | 8/1948 | United Kingdom . |
| 780872 | 8/1957 | United Kingdom . |
| 935501 | 8/1963 | United Kingdom . |
| 983564 | 2/1965 | United Kingdom . |
| 1065364 | 4/1967 | United Kingdom ................. 74/477 |
| 1195939 | 6/1970 | United Kingdom . |
| 1224832 | 3/1971 | United Kingdom . |

*Primary Examiner*—Allan D. Herrmann
*Attorney, Agent, or Firm*—Thompson, Birch, Gauthier & Samuels

[57] ABSTRACT

A shift interlock mechanism of a vehicle power transmission has a shift lever fixedly mounted on a control shaft. An interlock plate, which is formed with a slot, axially slidably engaging the shift lever, is further provided on its both sides with a pair of cylindrical members. The cylindrical members are coaxial with the control shaft and formed with slots which are contiguous with the slot of the interlock plate. As the shift lever is rotated to effect selective engagement of desired speed gears, the cylindrical members provide increased supporting area of the shift lever to withstand excessive bending moment applied thereto.

2 Claims, 4 Drawing Figures

SHIFT INTERLOCK MECHANISM OF A VEHICLE POWER TRANSMISSION

The present invention relates to a shift interlock mechanism of a vehicle power transmission including a control shaft which is rotated or axially moved by manually operating a control lever to effect selecting operation or shifting operation of different speed gears.

In such a transmission, axial movement or rotation of the control shaft is effected to select or shift one of the forks which actuates the relevant synchronizer to thereby establish engagement of the desired speed gear. Accordingly, the transmission is conventionally provided with a shift interlock mechanism which, when any one of the forks is selected, locks such that other forks cannot be shifted.

Various shift interlock mechanisms are known for which particular attention has been paid with respect to the mechanical strength. Namely, in a known mechanism in which rotation of the control lever is transmitted to the control shaft, and the selected fork is shifted by a shift lever projecting from the control shaft, the base portion of the shift lever is applied with a severe load which, in accordance with lever ratio of the associated elements, may amount to several hundred kilograms. In view of the above, the shift interlock mechanism has to be rigid enough to protect the shift lever from undesirable deformation or breakdown.

Still another prerequisite for the shift interlock mechanism is simplification of the arrangement required to improve the strength of the mechanism.

Since the shift interlock mechanism has to be necessarily provided for the gear selecting mechanism, the shift interlock mechanism is generally disposed at the same location as the gear selecting mechanism, and cannot be considered apart from the latter mechanism. In this specification, the term "shift interlock mechanism" is used to refer the gear selecting mechanism with the shift interlock means.

An object of the present invention is to provide an improved shift interlock mechanism which is simple in construction and superior in its mechanical strength.

According to the present invention, there is provided a shift interlock mechanism for a vehicle transmission including a control shaft which is rotated or axially moved by manually operating a control lever to effect selecting operation or shifting operation of different speed gears, the mechanism comprising a shift lever fixedly mounted on the control shaft, an interlock plate formed with a slot axially slidably engaging the shift lever, and a pair of cylindrical members disposed on opposite sides of the interlock plate and formed integrally with the interlock plate and coaxially with the control shaft, each of the cylindrical members being formed with a longitudinal slot which is of the same width as the slot of the interlock plate, the slots of the cylindrical members being contiguous with the slot of the interlock plate.

The present invention will now be explained in detail by referring to preferred embodiments shown in the drawings, in which.

Figure 1:
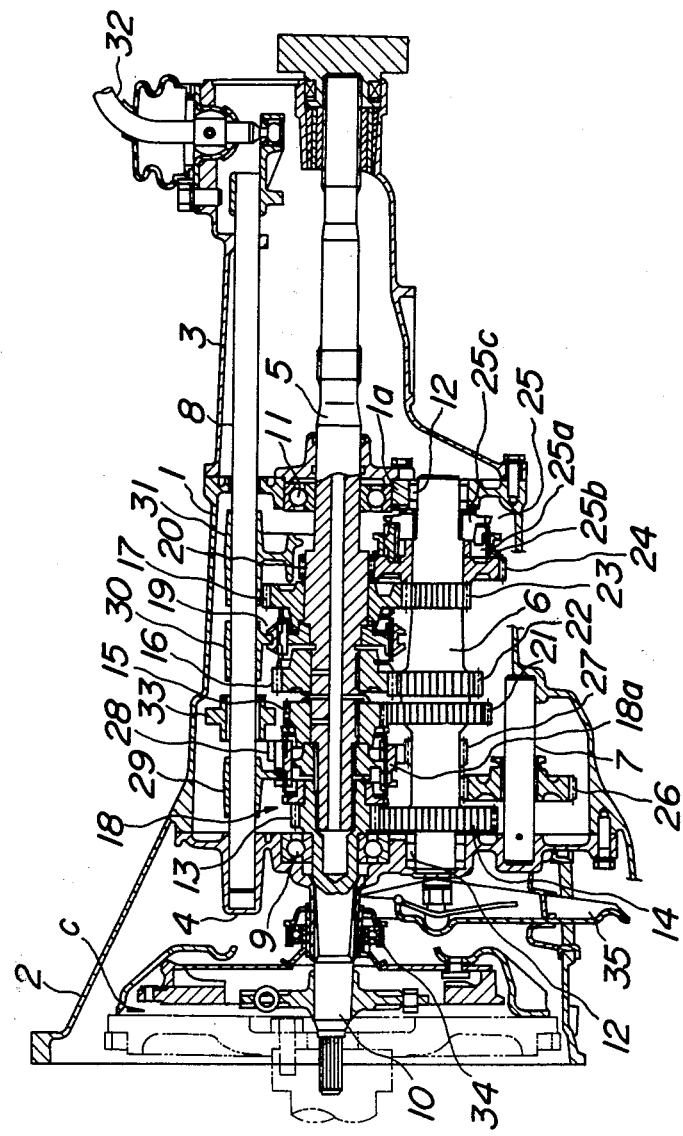
FIG. 1 is a longitudinal-sectional view of a vehicle transmission incorporating the shift interlock mechanism according to the present invention.

Referring firstly to FIG. 1, reference numeral 1 designates a transmission casing formed integrally with a clutch housing 2, 3 an extension casing formed separately from the transmission casing 1 and secured by screws on the rear end thereof, and 4 a front cover mounted on the front surface of the transmission casing 1. The transmission casing 1, the extension casing 3 and the front cover 4 jointly form a gear housing. In the gear housing, a main shaft 5, a counter shaft 6, an idle shaft 7 and a fork rod or a control shaft 8 are supported in parallel with each other and with the longitudinal direction.

The front end of the main shaft 5 is axially journaled and is freely rotatable in a hollow rear end of a main drive shaft 10 supported by a bearing 9 mounted the front cover 4. The main shaft 5 is supported at the middle portion thereof by a rear end wall of the transmission casing 1 by means of a bearing 11, and rear end of the main shaft 5 is arranged to extend towards the rear of the extension casing 3. The counter shaft 6 is supported at its front and rear ends by the front cover 4 and the rear end wall 1a of the transmission casing 1, respectively, with bearings 12 and 12. The idle shaft 7 is fixed at both its ends by the front cover 4 and a part of the transmission casing 1. The control shaft 8 extends between the transmission casing 1 and the extension casing 3, and is permitted, within limited ranges, to rotate about its own axis and to move axially.

The main drive shaft 10 is rotatably driven by the engine via a clutch shown at C. The torque is transmitted to the counter shaft 6 through a main drive gear 13 provided the rear end of the main drive shaft 10 and a counter gear 14 meshing therewith. On the main shaft 5 are rotatably mounted a third speed gear 15, a second speed gear 16 and a first speed gear 17 in this sequence from the front end of the shaft. Also mounted on the main shaft 5 are, synchronizers 18 and 19 between the main drive gear 13 and the third speed gear 15, and between the second speed gear 16 and the first speed gear 17, respectively. Furthermore, there is provided an overdrive gear 20 located adjacent to the rear side of the first speed gear 17.

The counter shaft 6 carries a third gear 21, a second gear 22 and a first gear 23 which are formed integrally with the shaft 6 and which are meshed with the respective speed gears 15, 16 and 17. At the rear end side of the first gear 23, there are provided a rotatably mounted overdrive gear 24 meshing with said overdrive gear 20, and a synchronizer 25 located adjacent thereto. This synchronizer 25 has a snychro-hub 25a spline-coupled to the overdrive gear 24 so as to allow rotation of a coupling sleeve 25b relative to the shaft 6, and a clutch 25c spline-coupled to the shaft 6 to rotate with said shaft.

On the idle shaft 7, a reverse idle gear 26 is axially movably mounted. When the reverse idle gear 26 is moved rightwardly from the position indicated, it meshes with a reverse gear 27 formed integrally with the counter shaft 6, and with a reverse gear 28 formed on the periphery of the coupling sleeve 18a of the synchronizer 18.

The control shaft 8 carries forks 29, 30 and 31 at their respective boss portions, each corresponding to the synchronizers 18, 19 and 25, respectively. The free ends of these forks 29, 30 and 31 are arranged angularly spaced about the axis of the control shaft 8. When the control shaft 8 is rotated about its axis by the control lever 32, a shift interlock mechanism 33, according to the present invention, and formed integrally with the shaft 8 selects one of the forks, and the thus selected fork is moved axially as the axial movement of the control shaft 8 takes place. An end of a lever 49 pivotally mounted on the casing is arranged to abut with the aforementioned reverse idle gear 26. Another end of the lever 49 is arranged to extend in parallel with the fork rods. At the time of selecting the reverse running condition, this lever is swung by the shift interlock mechanism to move the reverse idle gear 26 axially.

In FIG. 1, reference numeral 34 designates a release bearing, and 35 a withdrawal lever, both provided to disengage the cluth C.

Figure 2:
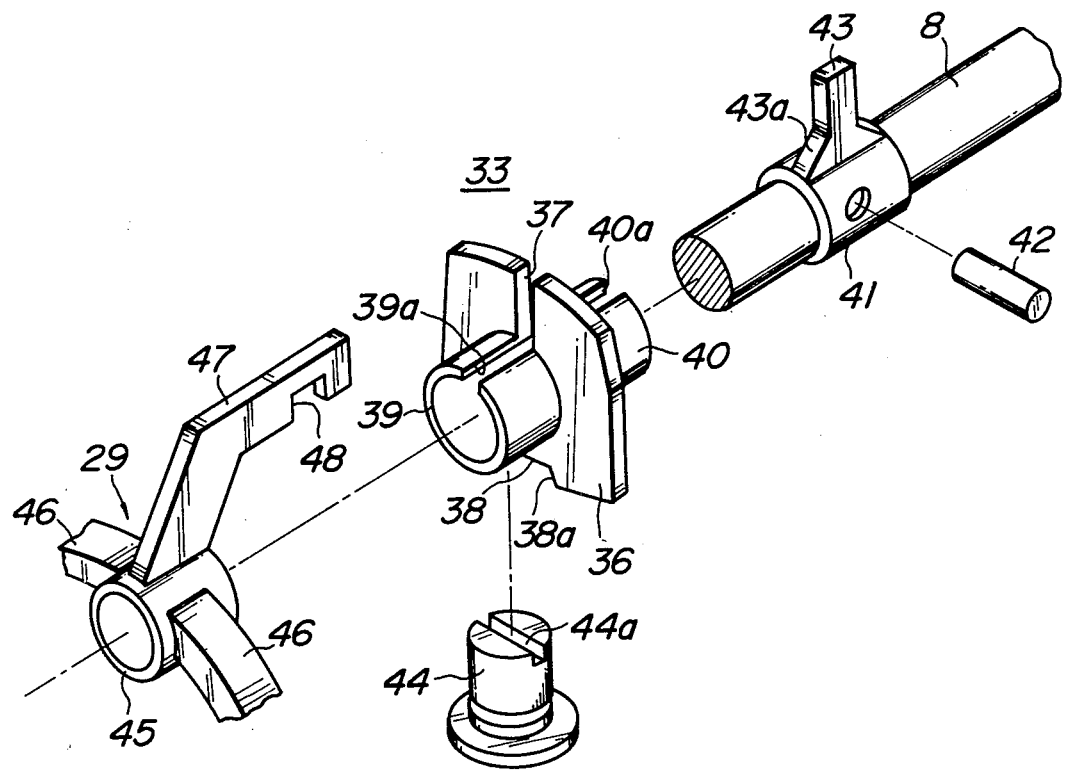
FIG. 2 is an exploded view of the shift interlock mechanism according to one embodiment of the present invention.

FIG. 2 is an exploded view of the shift interlock mechanism 33, according to the present invention, which comprises an interlock plate 36 having a generally square configuration. The interlock plate 36 is formed on its one edge with a central radial slot 37 and on the opposite edge with an arcuate cutout portion 38 terminating on each end at a stopper 38a.

The interlock plate 36 is provided on its both sides with integral cylindrical portions 39 and 40 which are arranged coaxially with the control shaft 8. The cylindrical portions 39 and 40 are formed with longitudinal slots 39a and 40a, respectively, each of which is of the same width as the slot 37 and is aligned with the latter so that all the slots 37, 39a and 40a are contiguous.

The cylindrical portions 39 and 40 slidably accommodate therein a boss 41 of a shift lever 43 which is fitted around, and fixedly connected to the control shaft 8 by means of a pin 42. The shift lever 43 has a thickness which is slightly smaller than the width of the slots 37, 39aand 40a. Base end 43a of the shift lever 43 has a length, extending axially of the control shaft 8, which increases toward the boss 41.

An interlock guide member 44 is fixedly mounted on the inner wall of the transmission casing 1, and the free end of the guide member 44 is formed with a slot 44a whose bottom surface has the same curvature as the arcuate cutout portion 38. The guide member 44 permits free rotation of the interlock plate 36 until the member 44 abuts with one of the stoppers 38a of the cutout portions 38.

As shown in FIG. 2, one of the forks, e.g. the fork 29 is slidably carried by the control shaft 8 at its boss portion 45 having sidewisely projecting forks 46 and an upwardly projecting shift fork 47. The shift fork 47 has at its free end a lower edge formed with a cutout 48 which slidably receives the interlock plate 36 and the shift lever 43.

Figure 3:
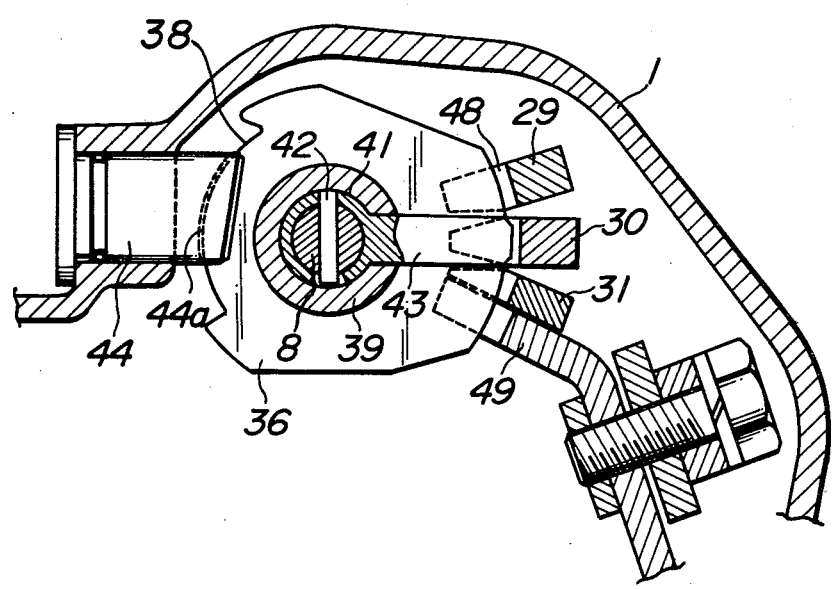
FIG. 3 is a cross-sectional view of the assembled mechanism shown in FIG. 2.

Other forks 30 and 31 may be identical in construction to the fork 29. The forks 30 and 31 are disposed on the opposite side of the interlock plate 36 as the fork 29 and are arranged in angularly spaced relationship with each other in respect of the axis of the control shaft, as shown in FIG. 3. In this figure, reference numeral 49 designates a shift fork for the reverse gears, whose other end (not shown) axially moves the reverse idle gear 26.

With the above-mentioned arrangement, as the control lever 32 is operated and the control shaft 8 is caused to rotate, the interlock plate 36 is rotated through the shift lever 43 so that a desired one of the forks 29, 30 and 31 is selected. When the shift lever 43 engages within the cutout 48 of the thus selected fork, the shift lever is moved axially along the slots 37, 39a and 40a together with the selected fork. Consequently, shift operation is made through the synchronizers.

During the selecting operation, the engagement between the base end 43a of the shift lever 43 and the slots 39a and 40a of the cylindrical portions 39 and 40 serve to provide sufficient supporting area of the shift lever 43. Thus, the shift lever 43 is effectively prevented from being subject to excessive bending moment about the axis of the control shaft 8. During the shifting operation in which the shift lever 43 is axially moved, the increased width of the base end 43a of the lever 43 provides sufficient rigidity of the lever 43 against the bending moment about an axis perpendicular to the axis of the control shaft 8 and to the longitudinal axis of the lever 43. Moreover, the cylindrical portions 39 and 40 serve to reinforce the interlock plate 36.

Figure 4:
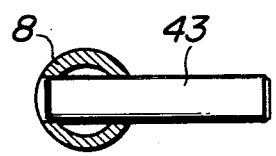
FIG. 4 is a cross-sectional view of a shift lever according to another embodiment of the present invention.

In the embodiment thus far described, the shift lever 43 is shown as being integral with the boss 41. However, as shown in FIG. 4, a separate lever 43 may extend transversely through the control shaft 8 and may then be fixed in place by means of welding, for example. The control shaft 8 may be a hollow shaft or a solid shaft.

From the foregoing, it will be appreciated that the present invention provides a shift interlock mechanism having a shift lever which is sufficiently supported and reinforced to withstand the severe bending moment and to avoid undesirable deformation or breakdown. It is noted that such an improvement is attained by a very simple and inexpensive arrangement.

What is claimed is:

1. A shift interlock mechanism for a vehicle transmission including a control shaft which is rotated or axially moved by manually operating a control lever to effect selecting operation or shifting operation of different speed gears, the mechanism comprising a shift lever fixedly mounted on the control shaft, an interlock plate formed with a slot axially slidably engaging the shift lever, and a pair of cylindrical members disposed on opposite sides of the interlock plate and formed integrally with the interlock plate and coaxially with the control shaft, each of the cylindrical members being formed with a longitudinal slot which is of the same width as the slot of the interlock plate, the slots of the cylindrical members being contiguous with the slot of the interlock plate.

2. The shift interlock mechanism as claimed in claim 1, wherein the base portion of the shift lever has a length extending in the axial direction and increasing toward the axis of the control shaft.

* * * * *